Aug. 15, 1939.   R. A. MINDERMAN   2,169,898
PROPELLER PULLER
Filed Oct. 29, 1938

Inventor
Robert A. Minderman
By Faust F. Crampton
Attorney

Patented Aug. 15, 1939

2,169,898

UNITED STATES PATENT OFFICE 2,169,898

PROPELLER PULLER

Robert A. Minderman, Port Clinton, Ohio

Application October 29, 1938, Serial No. 237,787

2 Claims. (Cl. 29—85)

My invention has for its object to provide an efficient readily connectable means for separating tightly fitting mechanical parts that are secured together by forcing parts into or onto other parts or to separate parts where the parts have been locked together as by rust or corrosion.

The invention may be contained in structures of different forms and to illustrate a practical application of the invention, I have selected a propeller puller as an example of the various structures that contain the invention and shall describe the selected structure hereinafter, it being understood that variations in the details of the structure may be made without departing from the spirit of the invention. The particular structure selected is shown in the accompanying drawing.

Figure 1:
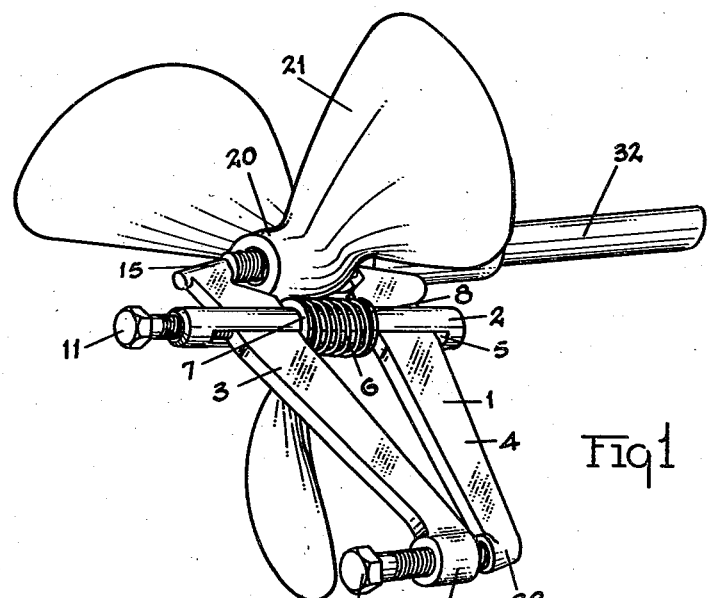
Figures 2, 3:
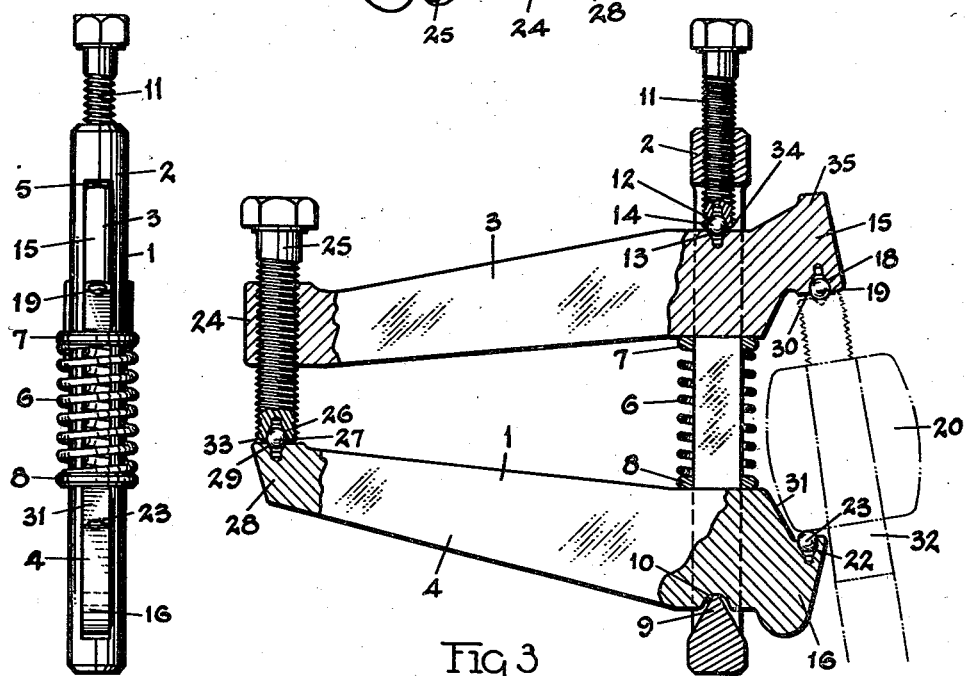

Fig. 1 illustrates a perspective view of the propeller puller. Fig. 2 illustrates an end view of the puller. Fig. 3 illustrates a side view of the puller, the end parts of the puller being shown in section to illustrate certain details of the structure of the puller.

The particular puller 1 illustrated in the drawing, is provided with a slender slotted rod 2 and a pair of relatively broad flat lever bars 3 and 4. The thickness of the bars 3 and 4 are such that the bars may be disposed within the slot 5 formed within the rod 2 and closely fit the side surfaces of the slot and yet enable movement of the lever bars longitudinally along the rod 2. A compression spring 6 is located intermediate the bars 3 and 4. Preferably, washers 7 and 8 are disposed intermediate the edge surfaces of the lever bars and the spring. The spring has an inner diameter that is but slightly larger than the exterior diameter of the rod 2.

One end of the rod 2 is provided with a V-shaped edge 9. The surface of the V-shaped edge 9 forms an end surface of the slot 5. The lever bar 4 is provided with a notch 10, preferably, concavedly and semicircular in form, to enable slight angular movement of the bar 4 within the slot 2 when the V-shaped edge 9 engages in the notch 10. The other end of the rod 2 is provided with a machine screw 11 that extends through a tapped opening formed in the end of the rod. The machine screw 11 extends into the end of the slot 5 and so as to engage the edge surface of the bar 3. The bar 3 is provided with a recess for receiving an end part of the screw to allow pivotal movement of the bar 3 relative to the rod 2. Preferably, the bar 3 is provided with a recess having a conical surface 13 and the inner end of the machine screw 11 is provided with a recess, having a conical surface 12. A hardened steel ball 14 is located in the recess formed in the end of the screw and the end edge part of the screw is flanged over the surface of the ball at a point outside the center of the ball to confine the ball and yet permit rotation of the ball within the recess of the screw 11. When the lever bar 3 is positioned to produce contact of the ball 14 with surface 13, the bar 3 may angularly move relative to the screw on the ball 14 when subjected to the pressure required to produce separation of the mechanical parts from each other.

The lever bars 3 and 4 are provided with heads 15 and 16 having a thickness substantially the same as the width of the slot 5 formed in the bar 2 to enable ready assembly of the parts of the puller. In order to separate the boat propellers from their shafts, when the shafts are mounted in the boat, engagement must be made with the end of the shaft and the hub of the propeller. The broad helical or screw blades commonly used in connection with boat propellers have edge parts at the hub that approximate alignment in directions parallel to the axis of the hub of the shaft. The relative flat clamping structure of the invention enables ready connection of the structure to the hub and the end of the shaft, by tilting the plane of the clamp to locate the clamp inclined to the axle of the shaft to dispose the clamp in close proximity to the hub and the proximate or over-extending edge parts of the contiguous broad blades of the propeller.

The head 15 of the lever bar 3 is provided with a recess having a conical surface 18 for receiving a hardened steel ball 19. The edges of the surface of the recess are flanged inwardly to secure the ball 19 within the recess and yet permit free rotation of the ball and angular movement of the bar 3 with respect to the rod 2. The outer surface of the ball 19 may be disposed in the conical centering recess commonly formed in the ends of the shafts. The head 16 of the lever bar 4 is provided with a recess having a conical surface 22 and a hardened steel ball 23 is located within the recess. The edge of the recess is flanged over a surface of the ball to permit free rotation of the ball within the recess and yet retain the ball therein. The ball 23 is adapted to engage the inner end of the hub 20 and when the screws 11 are rotated clockwise, the heads 15 and 16 are moved toward the end of the shaft 21 and the hub 20 against the pressure of the spring 6 and cause engagement of the balls with the shaft and the hub.

The end of the lever bar 3 is, also, provided with a boss 24 substantially cylindrical in form and axially tapped to receive the machine screw 25. The end of the screw 25 is provided with a recess having a conical surface 26 and a ball 27 is located within the recess and bears against the conical surface. The edge of the recess is inwardly flanged to engage the surface of the ball to enable free rotation of the ball within the recess. The end of the lever bar 4 is, preferably, formed with a conical boss 28 and is provided with a recess having a conical surface 29. The notch 10 of the bar 4 and the bearing surface 13 of the bar 3 are dimensionally located with respect to the machine screw 25 and the ball bearing surface 29 of the bar 4 to dispose the ball 27 in engaging relation with respect to the surface 29.

Owing to the fact that the lever bars 3 and 4, and particularly the head parts 15 and 16 of the bars, necessarily have relatively large cross-sectional areas to withstand the stresses that the bars and heads are subjected to and because of the limited range that is provided in the structure of the propeller wheels for the connection of the puller with the shaft and the propeller, the surface parts of the puller contiguous to the propeller are necessarily formed to prevent disconnection of the propeller by movement of the parts of the puller. A surface 30 of the head 15 is necessarily disposed in close proximity to the end surface of the shaft 32 and a surface 31 of the head 16 is necessarily disposed in close proximity to the lateral surface of the hub 20. Also, within the limitation of the relative movements of these surface parts of the heads, the end surfaces 33 and 34 of the screws that transmit their pressures through the hardened steel balls 14, 19, 23 and 27, are located in close proximity to the surfaces of the parts that the balls engage. The screws 11 and 25 may be simultaneous or alternately operated to exert the necessary leverage to produce the high pressure required and yet maintain the surface 30 and 31 of the heads and the surfaces 33 and 34 of the machine screws in their proper positions relative proximate of the puller, the shaft and the propeller to produce transmission of the maximum pressure, producible by the operation of the lever, through the hardened steel balls.

If desired, the head 15 of the bar 4 may be provided with a protruding boss 35 which may be hammered to obtain the advantage that is produced by jarring to aid in the separation of the propeller from the shaft.

I claim:

1. A propeller puller, a rod having a slot extending lengthwise the rod and having closed ends, a pair of lever bars located in the slot of the rod and having heads disposed in proximity to the rod, each of the heads having a rotatable hardened steel ball secured therein for engaging mechanical elements to be relatively moved by pressure, a machine screw extending through one end of one of the bars and having a part adapted to engage an end of the other of the bars, and a machine screw extending through the end of the rod and into the slot of the rod and having a part for engaging one of the bars, the screws operative to maintain substantially a constant relation of the parts and produce a high pressure upon the mechanical elements.

2. A propeller puller, a rod having a slot extending lengthwise the rod and having closed ends, a pair of lever bars located in the slot of the rod and having heads disposed in proximity to the rod, each of the heads having a rotatable hardened steel ball secured therein for engaging mechanical elements to be relatively moved by pressure, a machine screw extending through one end of the bars, and a machine screw extending through the end of the rod and into the slot of the rod, one of the bars and the rod having an interengaging V-shaped edge part and a notch, each of the screws having a rotatable hardened steel ball secured in its end and each of the bars having a recess for receiving the ball secured in a screw, a compression spring surrounding the rod and located intermediate the bars for engaging the more proximate edge surfaces of the bars, the screws operative to maintain substantially a constant relation of the parts and produce a high pressure upon the mechanical elements.

ROBERT A. MINDERMAN.